(12) United States Patent
Yu et al.

(10) Patent No.: US 7,791,282 B2
(45) Date of Patent: Sep. 7, 2010

(54) MOTION SENSOR SWITCH FOR 3-WAY LIGHT CIRCUIT AND METHOD OF LIGHTING CONTROL USING THE SAME

(75) Inventors: Daming Yu, Easton, CT (US); Tom Batko, Wallingford, CT (US)

(73) Assignee: Hubbell Incorporated, Shelton, CT (US)

( * ) Notice: Subject to any disclaimer, the term of this patent is extended or adjusted under 35 U.S.C. 154(b) by 952 days.

(21) Appl. No.: 11/604,895

(22) Filed: Nov. 28, 2006

(65) Prior Publication Data
US 2008/0122295 A1 May 29, 2008

(51) Int. Cl.
*H05B 37/02* (2006.01)
(52) U.S. Cl. .................... 315/209 R; 315/307; 315/317
(58) Field of Classification Search ............. 315/200 R, 315/209 R, 224, 225, 291, 307, 313, 362, 315/317, 318; 307/112, 116, 117, 137
See application file for complete search history.

(56) References Cited

U.S. PATENT DOCUMENTS

| | | | |
|---|---|---|---|
| 3,412,299 A | 11/1968 | Buscher et al. | |
| 3,459,961 A | 8/1969 | Ravas | |
| 3,878,358 A | 4/1975 | Barton et al. | |
| 3,934,156 A | 1/1976 | Galemmo et al. | |
| 4,193,055 A | 3/1980 | Barnum | |
| 4,234,822 A * | 11/1980 | Garrison et al. | 315/209 R |
| 4,287,468 A | 9/1981 | Sherman | |
| 4,296,449 A | 10/1981 | Eichelberger | |
| 4,305,021 A | 12/1981 | Schreiden | |
| 4,356,525 A | 10/1982 | Kornrumpf et al. | |
| 4,455,487 A | 6/1984 | Wendt | |
| 4,521,843 A | 6/1985 | Pezzolo et al. | |
| 4,636,774 A | 1/1987 | Galvin et al. | |
| 4,661,720 A | 4/1987 | Cameron, Jr. et al. | |
| 4,670,810 A | 6/1987 | Valeur | |
| 4,672,232 A | 6/1987 | Schoen | |
| 4,787,722 A | 11/1988 | Claytor | |
| 4,815,046 A | 3/1989 | Dorr | |
| 4,829,457 A | 5/1989 | Russo et al. | |
| 4,874,962 A | 10/1989 | Hermans | |
| 4,875,198 A | 10/1989 | Ariav | |
| 4,975,885 A | 12/1990 | Hassler et al. | |
| 5,055,962 A | 10/1991 | Peterson et al. | |
| 5,101,194 A | 3/1992 | Sheffer | |

(Continued)

OTHER PUBLICATIONS

"Lighting & Fan Speed Controls: Commercial Specification Grade PIR Motion Sensing Wall Switches", Cooper Wiring Devices, Long Island City, NY 11101, printed from www.cooperwiringdevices. com/catalog/print_prod_info.cfm... on Nov. 21, 2006.

(Continued)

*Primary Examiner*—Douglas W Owens
*Assistant Examiner*—Jimmy T Vu
(74) *Attorney, Agent, or Firm*—Stanislav Torqovitsky; Mark S. Bicks; Alfred N. Goodman (57) ABSTRACT

Systems and methods are provided for controlling light in a 3-way light circuit, where at least one of the switches in a 3-way light circuit includes an occupancy sensor and the on/off state of the load in the 3-way circuit is determined based on the voltage output of circuits configured to provide power to the 3-way light circuit.

20 Claims, 4 Drawing Sheets

U.S. PATENT DOCUMENTS

| | | | |
|---|---|---|---|
| 5,124,566 A | | 6/1992 | Hu |
| 5,179,324 A | | 1/1993 | Audbert |
| 5,189,393 A | | 2/1993 | Hu |
| 5,194,895 A | | 3/1993 | Bares |
| 5,220,250 A | | 6/1993 | Szuba |
| 5,267,120 A | | 11/1993 | Graff et al. |
| 5,276,427 A | | 1/1994 | Peterson |
| 5,283,551 A | | 2/1994 | Guscott |
| 5,331,308 A | | 7/1994 | Buccola et al. |
| 5,349,130 A | | 9/1994 | Iwaooji |
| 5,357,170 A | * | 10/1994 | Luchaco et al. ............. 315/159 |
| 5,359,486 A | | 10/1994 | Crane et al. |
| 5,386,210 A | | 1/1995 | Lee |
| 5,406,173 A | | 4/1995 | Mix et al. |
| 5,416,404 A | | 5/1995 | Baldwin |
| 5,430,635 A | * | 7/1995 | Liu ............................ 363/37 |
| 5,459,944 A | | 10/1995 | Tatsutani et al. |
| 5,473,202 A | | 12/1995 | Mudge et al. |
| 5,530,615 A | | 6/1996 | Miller et al. |
| 5,542,035 A | | 7/1996 | Kikinis et al. |
| 5,561,576 A | | 10/1996 | Baldwin |
| 5,578,988 A | | 11/1996 | Hoseit et al. |
| 5,640,113 A | | 6/1997 | Hu |
| 5,640,143 A | | 6/1997 | Myron et al. |
| 5,652,691 A | | 7/1997 | Fowler |
| 5,654,884 A | | 8/1997 | Mohan |
| 5,673,202 A | | 9/1997 | Baldenweg et al. |
| 5,699,243 A | | 12/1997 | Eckel et al. |
| 5,719,471 A | * | 2/1998 | Kachmarik ............. 315/209 R |
| 5,798,581 A | | 8/1998 | Keagy et al. |
| 5,804,991 A | | 9/1998 | Hu |
| 5,821,642 A | | 10/1998 | Nishhira et al. |
| 5,838,077 A | | 11/1998 | Chelcun et al. |
| 6,011,321 A | | 1/2000 | Stancu et al. |
| 6,729,740 B1 | | 5/2004 | Gazard |
| 6,798,341 B1 | | 9/2004 | Eckel et al. |
| 6,812,682 B2 | | 11/2004 | Hachiya |
| 6,933,686 B1 | | 8/2005 | Bishel |
| 7,009,111 B1 | | 3/2006 | Rintz |
| 7,014,836 B2 | | 3/2006 | Corma Canos et al. |
| 7,104,836 B1 | | 9/2006 | Gorman |
| 7,115,856 B2 | | 10/2006 | Peng et al. |
| 2002/0060530 A1 | | 5/2002 | Sembhi et al. |
| 2003/0092297 A1 | | 5/2003 | Reindle et al. |
| 2005/0043907 A1 | | 2/2005 | Eckel et al. |
| 2005/0115815 A1 | | 6/2005 | Endres et al. |
| 2006/0152888 A1 | | 7/2006 | Kurek et al. |

OTHER PUBLICATIONS

"WR-100 Residential Motion Sensing Wall Switch", Installation Instructions, The Watt Stopper, Santa Clara, CA 95050 (2001).

"Product Bulletin for Occupancy Sensor Wall Switches (Cat. Nos. PR150 & PR180)" Leviton, Little Neck, NY 11362 (2003).

"Leviton ez-Find Product Information: PR180-1LI", Residential Grade PIR Occupancy Sensor Wall Switch, printed from www.levitonhelpdesk.com/catalog/default.asp?server_name... on Nov. 21, 2006.

U.S. Dept. of Energy, "Occupant Sensors", *Advanced Lighting Guidelines: 1993*, at 10:1-13.

Audin, "Occupancy sensors: promise and pitfalls", E-Source Tech Update, Old Snowmass, CO, 1993.

Audin, "Occupancy sensors: More than high-tech toys", Architectural Record Lighting Supplement (1991), at 20-22.

Bahniuk,"Shrinking the Size of Light Sensors," Machine Design, Feb. 26, 1987, pp. 80-83.

Delguerico, "Computer Adventures (Readers share their off-beat experiences in home computing)", Popular Science, Jan. 1984, p. 138.

Webster, "Retrofitting Computers and Peripherals for Energy Efficiency", E-Source Tech Update, Boulder, CO, 1994.

Hart, "The Hypertek HomeBrain", Creative Computing, Aug. 1983, vol. 9, No. 8, pp. 100, 102, 104, 105 and 107.

Johnson, "Fuzzy logic escapes the laboratory", Electronic Engineering Times, Aug. 20, 1990, at 16.

Manji, "Smart sensors: the sixth sense for your plant", Controls & Systems, Feb. 1992, pp. 28-33.

Mullin, "EMS, Light Control, Mux Highlight Atlanta Show", Energy User News, Nov. 1983, at 16, 18, 19 and 20.

Lighting Controls Council, National Electrical Manufacturers Association, NEMA guide to Lighting Controls (1992).

Palko, "Controls for controlling the electric bill", Plant Engineering, Feb. 1989, pp. 58-64.

Puleo, "Maturing Technology Brings Growing Acceptance of Sensors," Energy User News Technology Report, Sep. 1991, at 17 and 22.

Semas, "Computers are turning green", The Business Journal, Feb. 7, 1991, pp. 21 and 26.

Davies,"Zerocrossing using a microcontroller", Electronic Engineering, vol. 56, No. 694, Oct. 1984, p. 38.

Husain et al., "Microcomputer based measurement of phase and frequency in a power system", Modeling, Simulation & Control, A, AMSE Press, vol. 31, No. 3, 1991, pp. 23-32.

Pinto et al., "Low frequency phase measurements with 555 IC", Electronic Engineering, Oct. 1979, vol. 51, No. 629, pp. 27 and 29.

Zandra, "Semiconductor switches for the control of machines and apparatus", Radio Elektronik Schau, vol. 51, No. 21, 1975, pp. 732-734.

* cited by examiner

FIG. 4

MOTION SENSOR SWITCH FOR 3-WAY LIGHT CIRCUIT AND METHOD OF LIGHTING CONTROL USING THE SAME

BACKGROUND OF THE INVENTION

1. Field of the Invention

The present invention generally relates to systems and methods for controlling room lighting where an occupancy sensor controls room lighting using standard infrared and/or motion sensor techniques. More particularly, the present invention relates to lighting systems and methods for controlling lighting in an area based on occupancy detection, where 3-way light circuit is employed and at least one of the switches in the 3-way light circuit includes an occupancy sensor.

2. Discussion of the Background

Conventional light management systems where an occupancy sensor is incorporated into a switch of a 3-way light control circuit have been described and implemented utilizing light switches provided by various manufacturers.

Figure 1A:
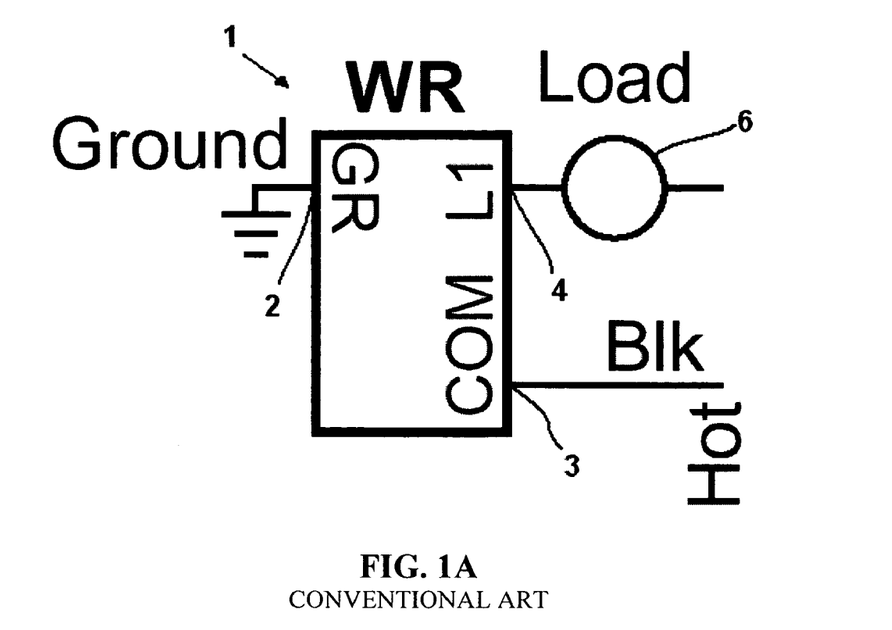
FIG. 1A is diagram showing a convention implementation of 3-way switch incorporating an occupancy sensor in a single pole configuration.
Figure 1B:
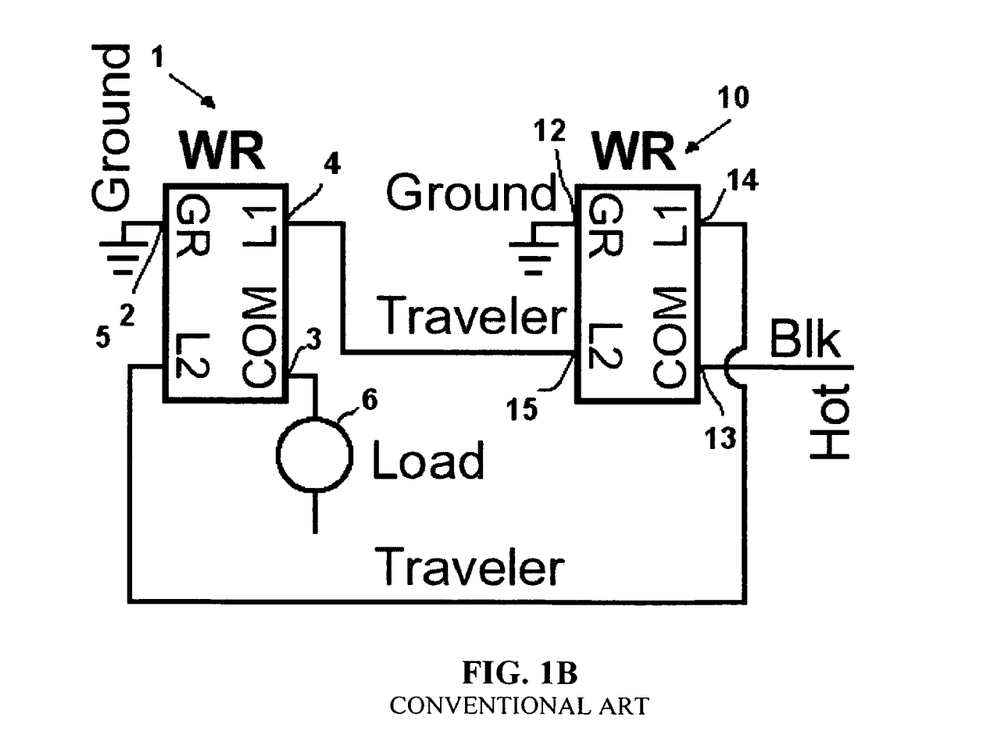
FIG. 1B is a diagram showing a convention implementation of two 3-way switches each incorporating an occupancy sensor in a 3-way light circuit.

For example, one of the conventional light switches that can be implemented in a 3-way light control circuit is shown in FIGS. 1A and 1B. The switch WR 1, which incorporates an occupancy sensor therein, includes ground terminal GR 2, common terminal COM 3 and traveler terminals L1 4 and L2 5. FIG. 1A shows connections for the switch WR 1 in a single pole configuration where the terminal L2 5 is not used, and instead terminal L1 4 is connected to the load 6. On the other hand, as shown in FIG. 1B, in a 3-way light circuit configuration, where two switches WR 1 and WR 10 each incorporating an occupancy sensor are used, travel terminals L1 4 and L2 5 of the first switch WR 1 are connected to travel terminals L2 15 and L1 14 of the second switch WR 10, respectively. As further shown in FIG. 1B, common terminal of the switch WR 1 is connected to the load 6, while the common terminal of the switch WR 10 is connected to the line-hot. When implementing switch WR 1 in a 3-way light circuit, three way operation is only recommended for applications with two such switches, as shown in FIG. 1B. If only WR 1 is used in a 3-way lighting circuit with a standard toggle switch (that does not incorporate an occupancy sensor), the toggle switch must always be turned on for the WR 1 to operate. See "WR-100 Residential Motion Wall Switch", Installation Instructions, The Watt Stopper, Santa Clara, Calif. 95050 (2001).

Figure 2:
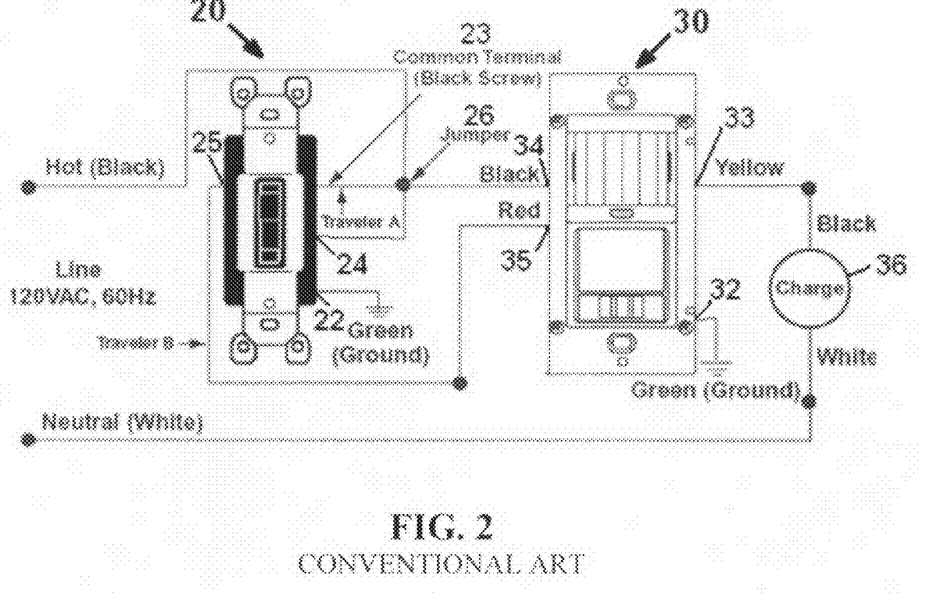
FIG. 2 is a diagram showing a convention implementation of a 3-way switch incorporating an occupancy sensor and a toggle switch in a 3-way light circuit.

Another conventional light switch which incorporates an occupancy sensor can be used in 3-way circuit with a standard toggle switch as shown in FIG. 2. In this configuration, a standard switch 20 which includes a traveler terminals 25 and 24, a common terminal 23 and ground terminal 22 is used. Switch 30, which incorporates an occupancy sensor, and is connected at terminal 34 of switch 20 by traveler A which is connected to the line-hot by means of jumper 26 to provide constant power to switch 30, and at terminal 35 by traveler B which is connected to the traveler terminal 25 of switch 20, and may be used to provide an indication of the on or off position of the switch 20. Output terminal 33 of switch 30 is connected to the load 36, and the ground terminal 32 is grounded in a conventional manner. See "Wiring Diagram", http://www.levitonhelpdesk.com/catalog/images/wdpr180.gif (downloaded Nov. 21, 2006). In the circuit as shown in FIG. 2, true 3-way circuit operation my not be achievable, may require to at the very least providing jumper 26, or may require complex processing to determine the on/off state of the load.

Accordingly, none of the conventional implementations provide 3-way switch incorporating an occupancy sensor that can be used with a convention toggle switch, or with the like 3-way switch incorporating an occupancy sensor, to provide a true 3-way light circuit that can be installed in a pre-wired 3-way light circuit without any wiring modification or extra wiring requirements.

SUMMARY OF THE INVENTION

Exemplary embodiments of the present invention address at least the above problems and/or disadvantages and provide at least the advantages described below.

Exemplary embodiments of the present invention provide a system and method where in a 3-way circuit configuration in at least one of the 3-way switches a first power derived from the first traveler terminal is output to a controller that controls output to a load, and a second power derived from the second traveler terminal is output to the controller via the second power input.

In an exemplary implementations of certain embodiments of the present invention, at least one of the first and second powers is derived by half-wave rectifying the respective one of the first and second inputs received form the respective one of the first and second traveler terminals.

In yet another exemplary implementation, the controller comprises an occupancy sensor for controlling the output to the load.

According to other exemplary embodiments of the present invention, voltage values at the first and second power inputs are compared to determine whether the load is on or off.

In an exemplary implementation of the present invention, a light source is connected between the first traveler terminal and the second traveler terminal of at least one of the 3-way switches.

In yet another exemplary implementation of the present invention, in at least one of the 3-way switches a push button is provided for selectively connecting a common terminals to one of the first and second traveler terminals.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF EXEMPLARY EMBODIMENTS

Referring now to the drawings, wherein like reference numerals designate identical or corresponding parts throughout, exemplary embodiments of the present invention are shown in schematic detail.

The matters defined in the description such as a detailed construction and elements are nothing but the ones provided to assist in a comprehensive understanding of the invention. Accordingly, those of ordinary skill in the art will recognize that various changes and modifications of the embodiments described herein can be made without departing from the scope and spirit of the invention. Also, well-known functions or constructions are omitted for clarity and conciseness. Likewise, it will be understood by skilled artisans that the specific voltage and resistance parameters referenced in the context of the exemplary embodiments and implementations of the present invention are simply exemplary and are not intended to limit the scope of the present invention.

At the outset, it is noted that exemplary embodiments of the present inventions are applicable to, and may share certain features with, occupancy sensors disclosed in U.S. Pat. Nos. 6,151,529 and 5,699,243, and the entire disclosures of both of these patents are hereby incorporated by reference.

According to exemplary embodiment of the present invention, a 3-way sensor switch fully compatible to a conventional 3-way mechanical switch and true replacement of such components is provided.

In another exemplary implementations of the embodiments of the present invention, the 3-way sensor switch can be installed in a pre-wired 3-way light circuit without any wiring modification by, for example, removing a conventional 3-way switch (e.g., a toggle switch) from the wall box of an existing 3-way light circuit and installing the 3-way sensor switch without any special or extra wiring requirement.

In yet another exemplary implementations of the embodiments of the present invention, a main sensor unit and a remote sensor unit in a 3-way light circuit are interchangeable, thus limiting installer's concerns on how the 3-way circuit is laid out.

According to an exemplary embodiment of the present invention, in a 3-way sensor switch power is supplied to the 3-way motion sensor switch, which makes full 3-way compatibility possible.

In another exemplary implementations of the embodiments of the present invention load or light on/off status detection is incorporated into the functionality of the switch.

Figure 3:
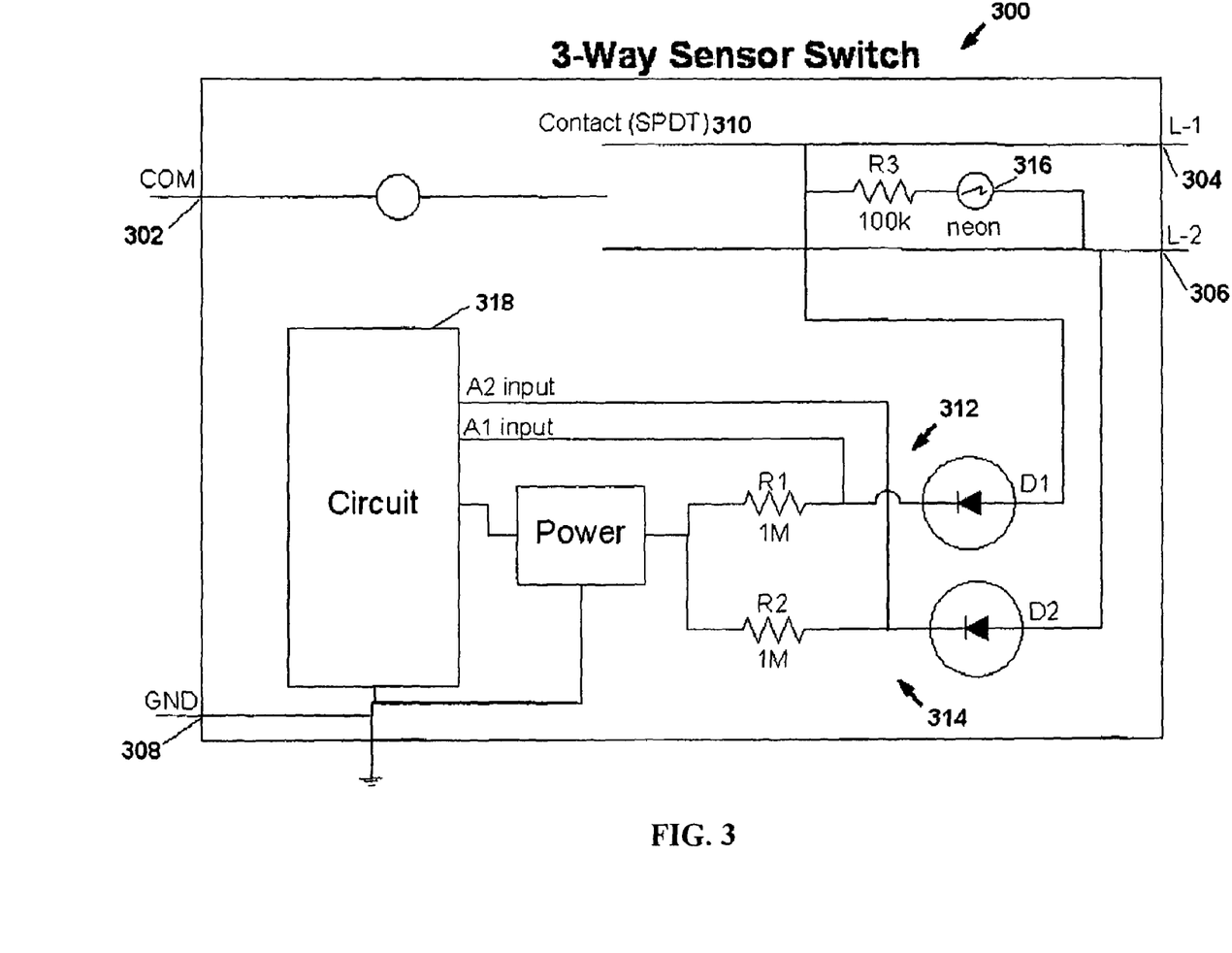
FIG. 3 is a diagram of a 3-way switch according to an exemplary embodiment of the present invention.

An example of a motion sensor switch for a 3-way light circuit in accordance with an embodiment of the present invention is illustrated in FIG. 3 where a 3-way sensor switch 300 is implemented as a 4-wire device comprising common terminal (COM) 302, traveler terminals (L-1 and L-2) 304 and 306, and ground terminal (GND) 308. The 3-way sensor switch can comprise any one, or combination, of the conventional sensing devices such as motion sensors, passive infrared sensor, light sensors, etc.

In an exemplary implementation, the 3-way sensor switch 300 is powered from the two travelers (wires L-1 and L-2) 304 and 306 by two half-wave rectifier circuits 312 and 314 comprising diode D1 and resistor R1, and diode D2 and resistor R2, respectively. According to the exemplary implementation, wires L-1 and L-2 in a 3-way circuit are complement, so that at any given time one of the wires is live, or connected to line-hot via contact (SPDT) 310. Once wired, the 3-way sensor switch 300 remains powered regardless of the position of the contact 310.

In an exemplary implementation, resistor R3 and light 316 (which comprises, for example, a neon light, an LED, etc.) are provide to, for example, provide illumination of the 3-way motion sensor 300 when the light (for example, the load) is off. The resistor R3 and light 316 also function to provide indication of load detection.

According to an exemplary embodiment, the 3-way motion sensor comprises a microcontroller 318 for detecting if the light (load) is ON or OFF by interpreting A1 and A2 inputs. A1 and A2 input values and their interpretation are detailed below. The microcontroller 318 can be implemented to include any one, or a combination of, occupancy sensors noted above, and can be implemented as in an ASIC or as separate microprocessors and/or controllers and/or sensors.

In an exemplary implementation, the operation of the 3-way sensor switch according to an embodiment of the present invention is described as follows. A push button switch can be provided with the 3-way sensor switch 300 so that the position of the contact 310 can be flipped when a user presses the switch. This operation will turn the light (load) from ON to OFF, or from OFF to ON. On the other hand, the lights can turn on automatically, if an automatic on feature is enabled. If a motion is detected and the light is OFF (as determined by microcontroller 318 based on A1 and A2 inputs), the 3-way sensor switch 300 will turn the light ON by, for example, flipping the contact 310.

In an exemplary implementation, an automatic light off feature can be provided by, for example, means of a timer such that if the light hold-on time expires and the light is ON (as determined by microcontroller 318 based on A1 and A2 inputs), the 3-way sensor switch 300 will turn the light OFF by, for example, flipping the contact 310.

A method for light control utilizing at least one 3-way sensor switch according to an embodiment of the present invention is described as follows. If an occupant walks into an area implementing a 3-way light circuit comprising a 3-way sensor switch (such as a switch shown in FIG. 3) from one entrance, the light in the area can be turned on by pressing the switch (for example, a push button switch). If the occupant leaves the area through the same entrance or through another exit, the light can be turned off by pressing the switch (for example, a push button switch). If an occupant enters the area where the light has been on, the light will remain on until the room is no longer occupied or the occupant presses the push button switch on any of the two 3-way sensor switches in the 3-way light circuit.

If the automatic on feature is enabled in the 3-way sensor switch, the light will be turned on when an occupant enters the area where the light is off. The light will remain on until the room is no longer occupied or the occupant presses the push button switch on any of the two 3-way sensor switches in the 3-way light circuit.

Figure 4:
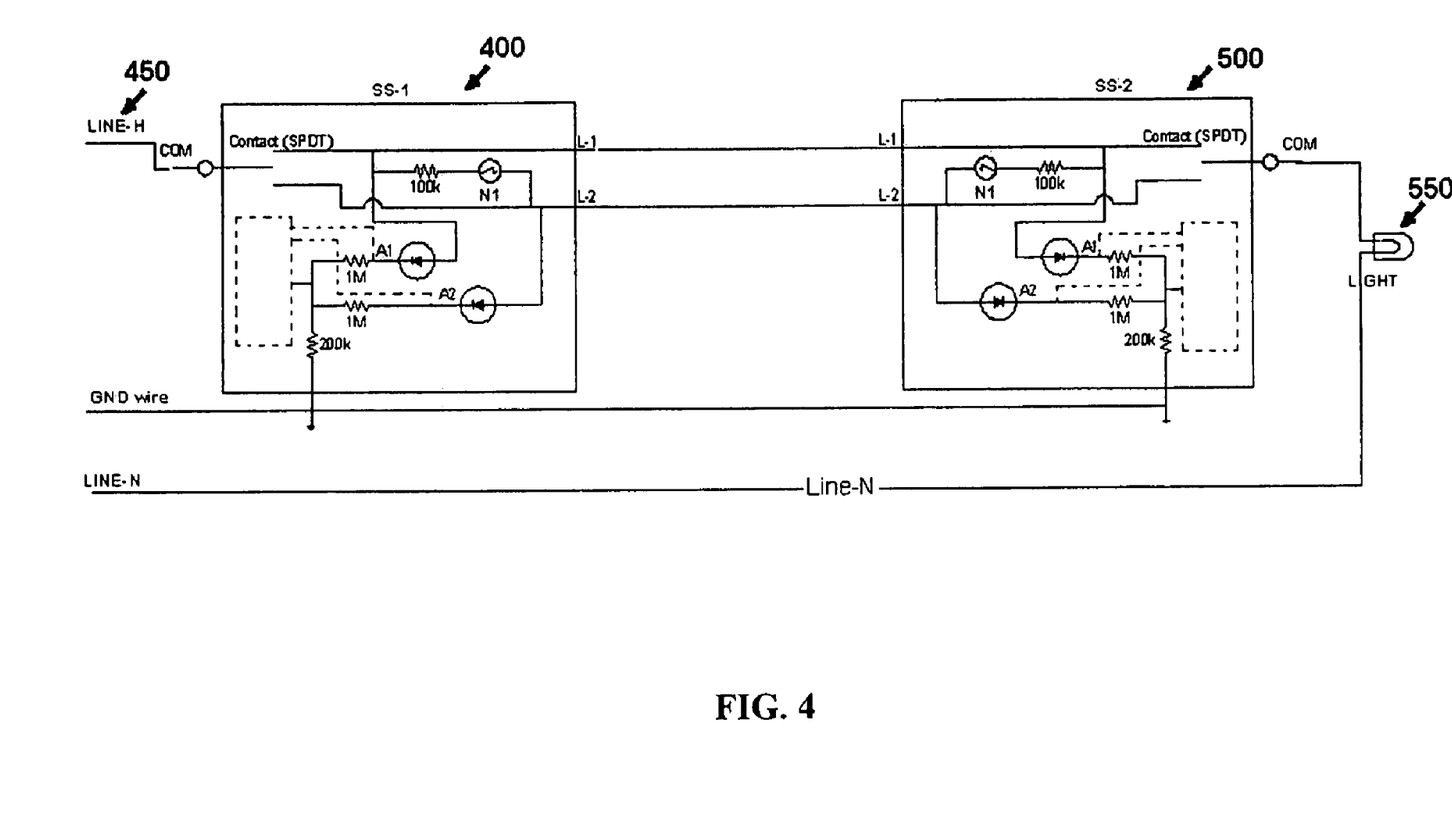
FIG. 4 is a diagram of a 3-way light circuit according to an exemplary embodiment of the present invention.

The load on/off detection features according to an exemplary embodiment of the present invention, is described in the context of an exemplary implementation of a 3-way light circuit comprising two 3-way sensor switches as shown in FIG. 4, where switches 400 and 500 comprise analogous components analogous to those illustrated in the 3-way sensor switch shown in FIG. 3. As shown in FIG. 4, traveler terminals L1 and L2 of switch 400 are connected to the respective traveler terminals L1 and L2 of switch 500, common terminal COM of switch 400 is connected to line-hot 450, and common terminal COM of switch 500 is connected to light (load) 550.

In an exemplary operational scenario, peak values of waveforms of A1 and A2 for 3-way sensor switches 400 and 500 are as listed in Table-1 below.

TABLE 1

Peak Voltage Values at A1 and A2
3-way light circuit (FIG. 4)

| | swtch 400 | | | | | switch 500 | | | |
|---|---|---|---|---|---|---|---|---|---|
| | Contact | V (A1) | V (A2) | L1 | L2 | Contact | V (A1) | V (A2) | Light 550 | Neon N1 |
| Case 1 | up | 170 | 90 | 170 | 90 | up | 170 | 90 | on | off |
| Case 2 | up | 170 | 28 | 170 | 3 | down | 170 | 9 | off | on |
| Case 3 | down | 10 | 170 | 3 | 170 | up | 27 | 170 | off | on |
| Case 4 | down | 90 | 170 | 90 | 170 | down | 90 | 170 | on | off |

Referring to the data shown in Table 1, when the light (load) 550 is on:
  Either L1 or L2 is connected to both Line-Hot and the load (170V peak AC). The voltages measured at the related A1 or A2 is the same values at L1 or L2.
  The other traveler (L2 or L1) is floating. Due to the weak leakage through the neon light circuit (N1 and 100 k resistor), the voltages measured at the related A2 or A1 (around 90V peak AC) is not as low as line-neutral or as high as line-hot.
On the other hand, when the light (load) 550 is off:
  Either L1 or L2 is connected to Line-Hot by 3-way switch 400 (170V peak AC), and is not connected to the load. The voltages measured at the related A1 or A2 have the same values at L1 or L2.
  The other traveler (L2 or L1) is connected to the load by switch 500 and through load to line-neutral. The voltages measured at this traveler (3V peak AC) are almost 0. Due to the weak coupling from the circuit (such as a circuit for a motion sensor), the voltages measured at the related A2 or A1 will be a little higher than the values on L2 or L1 (10V or 28V peak).

Referring to the relative voltage magnitudes shown in Table 1, it can be seen that the light (load) 550 is ON if A1 (or A2) is higher than 150V (peak), and A2 (or A1) is not lower than 50V (peak). On the other hand, the light (load) 550 is OFF if A1 (or A2) is higher than 150V (peak), but A2 (or A1) is lower than 50V (peak). Accordingly, a determination as to the state of the load can be made with reference to the following matrix:

| Light ON/OFF Detection | | |
|---|---|---|
| V (A1) | V (A2) | Light |
| >150 V | >50 V | ON |
| >150 V | <50 V | OFF |
| >50 V | >150 V | ON |

An exemplary operational scenario where a single 3-way sensor switch (as shown in FIG. 3) is implemented in a 3-way light circuit with, for example, a toggle switch can be described in a manner similar to the two-switch implementation with reference to the Table 2 below which lists peak values of waveforms of A1 and A2 for the 3-way sensor switch 300.

TABLE 2

Peak Voltage Values at A1 and A2
3-way light circuit (single 3-way sensor switch)

| | switch 300 | | | | | | | toggle switch |
|---|---|---|---|---|---|---|---|---|
| | Contact | V (A1) | V (A2) | L1 | L2 | Light 550 | Neon N1 | Contact |
| Case 1 | up | 170 | 90 | 170 | 90 | on | off | up |
| Case 2 | up | 170 | 28 | 170 | 3 | off | on | down |
| Case 3 | down | 10 | 170 | 3 | 170 | off | on | up |
| Case 4 | down | 90 | 170 | 90 | 170 | on | off | down |

Accordingly, a determination as to the state of the load in a 3-way light circuit implementing a single 3-way sensor switch (as shown in FIG. 3) can be made with reference to the following matrix:

| Light ON/OFF Detection | | |
|---|---|---|
| V (A1) | V (A2) | Light |
| >150 V | >50 V | ON |
| >150 V | <50 V | OFF |
| >50 V | >150 V | ON |

While the present invention has been described with reference to certain exemplary embodiments thereof, numerous additional modifications and variations of the present invention are possible in light of the above teachings.

For example, additional features can be incorporated in 3-way sensor switched of exemplary implementations of the embodiments of the present invention, including: an Auto-Flip-Back-On feature if provided to eliminate nuisance lights off in 3-way light control; and/or hold-on time automatic extension for certain application and automatic recovery to a user's presetting are provided where for automatic extension, if the 3-way sensor switch detects a motion right before or after it turns off the light, the sensor will keep the light on or back on and adjusts/updates the current hold-on time to be longer, and for automatic recovery to user's presetting, the automatic extension is applied temporally and after the light is turned off the unit will reset the user's hold-on time presetting.

It is therefore to be understood that within the scope of the appended claims, the present invention may be practiced otherwise than as specifically described herein.

We claim:

1. A switch comprising:
    a controller for controlling output to a load, the controller comprising a first power input and a second power input;
    a first terminal for connecting to a common line;
    a second terminal for connecting to ground;
    a first traveler terminal;
    a second traveler terminal;
    a first power circuit configured to receiving a first input from the first traveler terminal, and output a first power derived from the first traveler terminal to the controller via the first power input; and
    a second power circuit configured to receiving a second input from the second traveler terminal, and output a second power derived from the second traveler terminal to the controller via the second power input,
    wherein the controller comprises a comparator for comparing voltage values at the first and second power inputs for determining whether the load is on or off.

2. The switch of claim 1, wherein at least one of the first and second power circuits comprises a half-wave rectifier circuit.

3. The switch of claim 1, wherein the controller comprises an occupancy sensor for controlling output to the load.

4. The switch of claim 1, further comprising a light source connected between the first traveler terminal and the second traveler terminal.

5. The switch of claim 4, wherein the light source comprises a resistor and a light emitting element connected in series between the first and second traveler terminals.

6. The switch of claim 1, further comprising a contact configured to connect the first terminal to one of the first and second traveler terminals.

7. A circuit comprising:
    a first 3-way switch; and
    a second 3-way switch;
    wherein the first 3-way switch and the second 3-way switch are connected in a 3-way circuit configuration, and at least one of the first and second 3-way switches comprises:
        a controller for controlling output to a load, the controller comprising a first power input and a second power input;
        a first terminal for connecting to a common line;
        a second terminal for connecting to ground;
        a first traveler terminal;
        a second traveler terminal;
        a first power circuit configured to receiving a first input from the first traveler terminal, and output a first power derived from the first traveler terminal to the controller via the first power input; and
        a second power circuit configured to receiving a second input from the second traveler terminal, and output a second power derived from the second traveler terminal to the controller via the second power input,
    wherein the controller comprises a comparator for comparing voltage values at the first and second power inputs for determining whether the load is on or off.

8. The circuit of claim 7, wherein at least one of the first and second power circuits comprises a half-wave rectifier circuit.

9. The circuit of claim 7, wherein the controller comprises an occupancy sensor for controlling output to the load.

10. The circuit of claim 7, wherein the at least one of the first and second 3-way switches further comprises a light source connected between the first traveler terminal and the second traveler terminal.

11. The circuit of claim 10, wherein the light source comprises a resistor and a light emitting element connected in series between the first and second traveler terminals.

12. The circuit of claim 7, wherein the at least one of the first and second 3-way switches further comprises a contact configured to connect the first terminal to one of the first and second traveler terminals.

13. A circuit comprising:
    a first 3-way switch; and
    a second 3-way switch;
    wherein the first 3-way switch and the second 3-way switch are connected in a 3-way circuit configuration, and at least one of the first and second 3-way switches comprises:
        a controller for controlling output to a load, the controller comprising a first power input and a second power input;
        a first terminal for connecting to a common line;
        a second terminal for connecting to ground;
    a first traveler terminal;
    a second traveler terminal;
        a first power circuit configured to receiving a first input from the first traveler terminal, and output a first power derived from the first traveler terminal to the controller via the first power input; and
        a second power circuit configured to receiving a second input from the second traveler terminal, and output a second power derived from the second traveler terminal to the controller via the second power input,
    wherein the other of the first and second 3-way switches comprises a toggle switch, the toggle switch comprising:
        a third terminal for connecting to the load via the common line;
        a fourth terminal for connecting to the ground;
        a third traveler terminal; and
        a fourth traveler terminal; and
    wherein the first terminal is connected to a line-hot, the second terminal and the fourth terminal are connected to the ground, the third terminal is connected to the load, the first traveler terminal is connected to the third traveler terminal and the second traveler terminal is connected to the fourth traveler terminal.

14. A circuit comprising:
a first 3-way switch; and
a second 3-way switch;
wherein the first 3-way switch and the second 3-way switch are connected in a 3-way circuit configuration, and at least one of the first and second 3-way switches comprises:
  a controller for controlling output to a load, the controller comprising a first power input and a second power input;
  a first terminal for connecting to a common line;
  a second terminal for connecting to ground;
  a first traveler terminal;
  a second traveler terminal;
  a first power circuit configured to receiving a first input from the first traveler terminal, and output a first power derived from the first traveler terminal to the controller via the first power input; and
  a second power circuit configured to receiving a second input from the second traveler terminal, and output a second power derived from the second traveler terminal to the controller via the second power input,
wherein the other of the first and second 3-way switches comprises:
  a second controller for controlling output to the load, the second controller comprising a third power input and a fourth power input;
  a third terminal for connecting to the common line;
  a fourth terminal for connecting to the ground;
  a third traveler terminal;
  a fourth traveler terminal;
  a third power circuit configured to receiving a third input from the third traveler terminal, and output a third power derived from the third traveler terminal to the second controller via the third power input; and
  a fourth power circuit configured to receiving a fourth input from the fourth traveler terminal, and output a fourth power derived from the fourth traveler terminal to the controller via the fourth power input; and
wherein the first terminal is connected to a line-hot, the second terminal and the fourth terminal are connected to the ground, the third terminal is connected to the load, the first traveler terminal is connected to the third traveler terminal and the second traveler terminal is connected to the fourth traveler terminal.

15. A method for providing on/off control in a 3-way circuit, comprising:
  configuring at least one 3-way switch comprising a first terminal for connecting to a common line, a second terminal for connecting to ground, a first traveler terminal and a second traveler terminal;
  receiving a first input from the first traveler terminal, and outputting first power derived from the first traveler terminal to a controller of the at least one 3-way switch via the first power input, the controller controlling output to a load;
  receiving a second input from the second traveler terminal, and outputting second power derived from the second traveler terminal to the controller via the second power input; and
  comparing voltage values at the first and second power inputs to determine whether the load is on or off.

16. The method of claim 15, wherein at least one of the first and second powers is derived by half-wave rectifying the respective one of the first and second inputs received form the respective one of the first and second traveler terminals.

17. The method of claim 15, wherein the controller comprises an occupancy sensor for controlling output to the load.

18. The method of claim 15, further comprising connecting a light source between the first traveler terminal and the second traveler terminal.

19. The method of claim 18, wherein the light source comprises a resistor and a light emitting element connected in series between the first and second traveler terminals.

20. The method of claim 15, further comprising selectively connecting the first terminal to one of the first and second traveler terminals.

* * * * *